Patented Oct. 9, 1928.

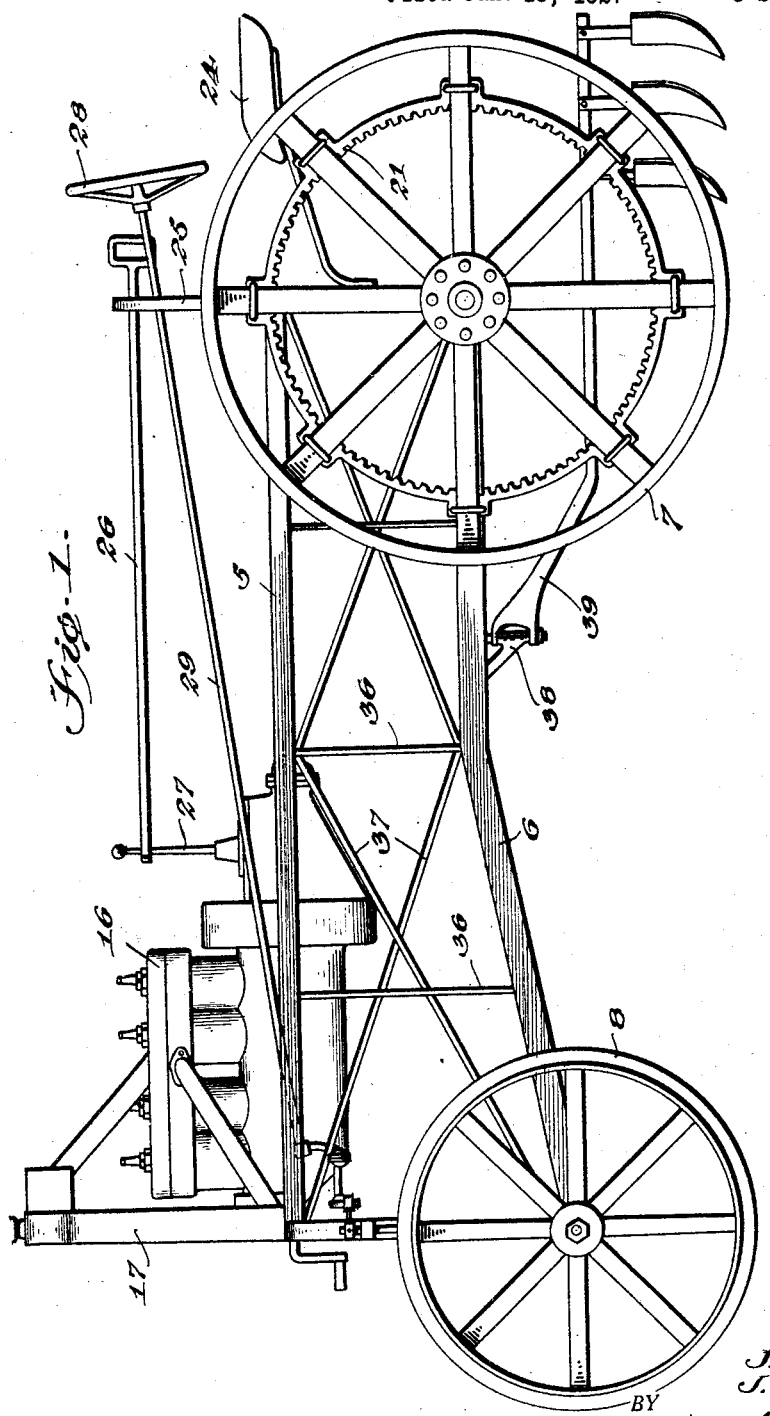

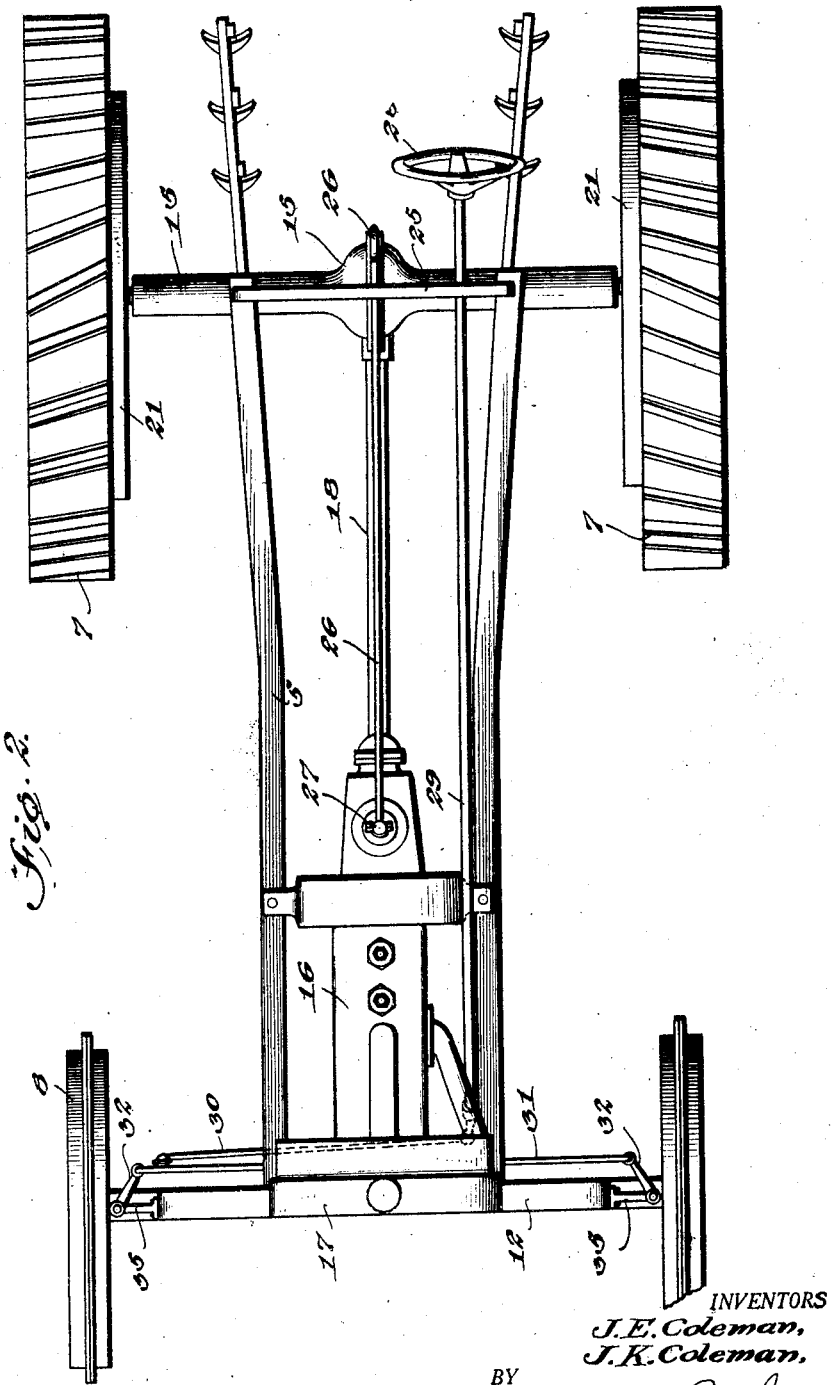

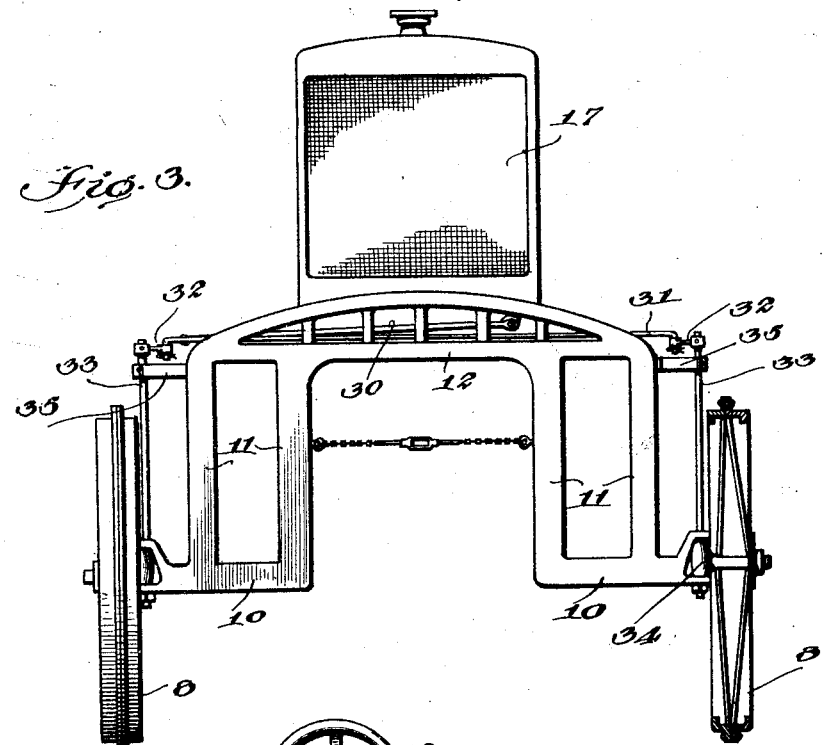
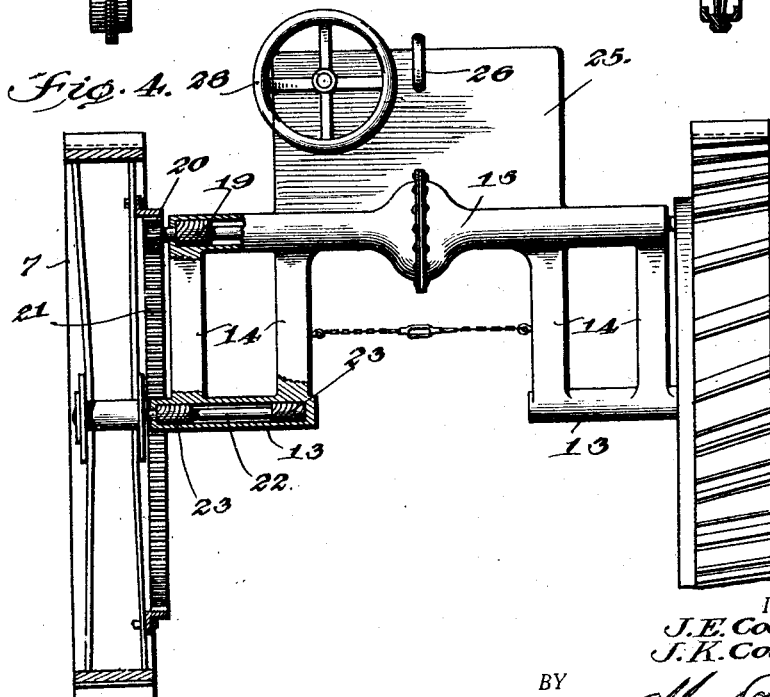

1,686,900

UNITED STATES PATENT OFFICE.

JOSIAH E. COLEMAN AND JESSE K. COLEMAN, OF FORT SMITH, ARKANSAS.

CULTIVATOR.

Application filed January 13, 1927. Serial No. 160,912.

Our invention relates to tractors and more particularly to devices of this character which are adapted for soil cultivation and having the frame designed to straddle the row of plants being worked.

An object of the invention is to provide an apparatus of this character which is strong and durable in construction, easy to operate and relatively inexpensive to manufacture.

A further object is to provide a steering apparatus and drive means for the tractor mounted near the top frame of the machine so as not to interfere with the plants in the field over which the same is traveling.

Other objects and advantages reside in the novel construction, combination and arrangement of elements forming part of the invention as hereinafter more particularly described and specifically claimed, reference being had to the accompanying drawing forming part hereof wherein like numerals refer to like parts throughout and in which Figure 1 is a side elevational view, Figure 2 is a top plan view, Figure 3 is a view in front elevation, and Figure 4 is a view in rear elevation with parts in section to illustrate the drive mechanism.

Referring now to the drawings wherein for the purpose of illustration we have shown a preferred embodiment of our invention, we provide a tractor frame including upper longitudinally extending side members 5 and lower side members 6, the lower members being arranged at a horizontal plane with the upper members at the rear end of the machine and at a level with the hub of the large rear wheels 7. And at a point midway of the machine and extending forwardly said lower members are inclined downwardly to a level with the hub of the smaller front wheels 8.

At the front end of the tractor we provide a support connecting the front ends of the side members and comprising separate axle mountings 10 at each side for the front wheels and spaced parallel vertical sections 11 connected at their tops by a transverse member 12, the support thus forming an arch providing an unobstructed central longitudinal passageway along the machine.

The rear end is provided with a similar arch-shaped support having separate axle mountings 13 at each side and spaced parallel vertical sections 14 connected at their tops by a transverse member 15.

At the front of the machine and upon the upper side members is mounted a power plant 16 which may be of any suitable type preferably comprising a gas engine and having a radiator 17 forwardly thereof and a drive shaft 18 extending rearwardly to the transverse member 15 of the rear support. The member 15 is hollow in construction and comprises a housing for the drive axles 19 arranged therein and extending toward opposite sides thereof and having small spur gears 20 secured to their outer ends. The rear wheels 7 have bull wheels 21 attached to the inner sides thereof and provided with teeth along their inner periphery for engagement with the gears 20. The hubs of the rear wheels are mounted on shafts 22 rotatably carried with the axle mountings 13, suitable bearings 23 being provided for the shafts. Thus the tractor is driven by the motor in a conventional manner through the drive axles and the gears connected with the rear tractor wheels.

Upon the rear support is also attached the operator's seat 24 and a vertical bracket 25 supporting the rear end of an extension 26 connected with the gear shift lever 27 and a steering wheel 28, said wheel having a steering rod 29 extending forwardly and attached to the usual drag link 30 and tie rod 31. The ends of the tie rod are connected to short levers 32 attached to the upper ends of rods 33 which extend downwardly through and are fixedly secured to the steering knuckles 34 forming the mountings for the front wheels. The upper ends of the rods 33 are supported in a vertical plane by brackets 35 attached near the top of the front support member.

The upper and lower side members 5 and 6 are braced intermediate their ends by vertically arranged supports 36 and angularly arranged supports 37.

A coupling 38 is carried by one of the lower members to which a suitable plow beam 39 or other suitable device may be connected.

We claim:

A tractor frame comprising front and rear arch shaped frame members connected by longitudinally extending frame members, said arch shaped members being formed of double spaced apart vertical side members connected at their lower ends whereby to provide an axle housing at the opposite sides of the lower ends of said arch members of a length equal to the distance of the space between said double vertical side members.

In testimony whereof we affix our signatures.

JOSIAH E. COLEMAN.
JESSE K. COLEMAN.